(12) United States Patent
Purkayastha et al.

(10) Patent No.: US 11,647,771 B2
(45) Date of Patent: May 16, 2023

(54) STEVIOL GLYCOSIDE COMPOSITIONS

(71) Applicant: PureCircle USA Inc., Oak Brook, IL (US)

(72) Inventors: Siddhartha Purkayastha, Chicago, IL (US); John Martin, Chicago, IL (US); Marcia Petit, Chicago, IL (US); Kristina Chkhan, Kuala Lumpur (MY)

(73) Assignee: PURECIRCLE USA INC., Westchester, IL (US)

( * ) Notice: Subject to any disclaimer, the term of this patent is extended or adjusted under 35 U.S.C. 154(b) by 37 days.

(21) Appl. No.: 15/771,248

(22) PCT Filed: Oct. 26, 2016

(86) PCT No.: PCT/US2016/058834
§ 371 (c)(1),
(2) Date: Apr. 26, 2018

(87) PCT Pub. No.: WO2017/075034
PCT Pub. Date: May 4, 2017

(65) Prior Publication Data
US 2018/0317534 A1 Nov. 8, 2018

Related U.S. Application Data

(60) Provisional application No. 62/255,838, filed on Nov. 16, 2015, provisional application No. 62/246,412, filed on Oct. 26, 2015.

(51) Int. Cl.
*A23L 27/30* (2016.01)
*A23L 33/20* (2016.01)
*A23L 2/60* (2006.01)

(52) U.S. Cl.
CPC ............... *A23L 27/36* (2016.08); *A23L 2/60* (2013.01); *A23L 33/20* (2016.08); *A23V 2002/00* (2013.01); *A23V 2200/132* (2013.01); *A23V 2200/15* (2013.01); *A23V 2250/258* (2013.01); *A23V 2250/262* (2013.01)

(58) Field of Classification Search
CPC ............. A23L 27/36; A23V 2200/132; A23V 2200/15; A23V 2250/258
USPC ....................................................... 426/658
See application file for complete search history.

(56) References Cited

U.S. PATENT DOCUMENTS

| | | |
|---|---|---|
| 2,500,173 A | 3/1950 | Gisvold |
| 2,615,015 A | 10/1952 | Wilson |
| 3,723,410 A | 3/1973 | Persinos |
| 4,082,858 A | 4/1978 | Morita |
| 4,112,218 A | 9/1978 | Inoue |
| 4,171,430 A | 10/1979 | Matsushita |
| 4,219,571 A | 8/1980 | Miyake |
| 4,361,697 A | 11/1982 | Dobberstein |
| 4,454,290 A | 6/1984 | Dubois |
| 4,590,160 A | 5/1986 | Nishihashi |
| 4,599,403 A | 7/1986 | Kumar |
| 4,612,942 A | 9/1986 | Dobberstein |
| 4,657,638 A | 4/1987 | le Grand |
| 4,892,938 A | 1/1990 | Giovanetto |
| 4,915,969 A | 4/1990 | Beyts |
| 4,917,916 A | 4/1990 | Hirao |
| 5,112,610 A | 5/1992 | Kienle |
| 5,576,042 A | 11/1996 | Fuisz |
| 5,779,805 A | 7/1998 | Morano |
| 5,830,523 A | 11/1998 | Takaichi |
| 5,962,678 A | 10/1999 | Payzant |
| 5,972,120 A | 10/1999 | Kutowy |
| 6,031,157 A | 2/2000 | Morita |
| 6,080,561 A | 6/2000 | Morita |
| 6,204,377 B1 | 3/2001 | Nishimoto |
| 6,228,996 B1 | 5/2001 | Zhou |
| 6,318,157 B1 | 11/2001 | Corso |
| 6,706,304 B1 | 3/2004 | Ishida |
| 7,807,206 B2 | 10/2010 | Magomet |
| 7,838,011 B2 | 11/2010 | Abelyan |
| 7,862,845 B2 | 1/2011 | Magomet |
| 8,030,481 B2 | 10/2011 | Prakash |
| 8,257,948 B1 | 9/2012 | Markosyan |
| 8,318,459 B2 | 11/2012 | Markosyan |
| 8,647,844 B2 | 2/2014 | Markosyan |
| 8,669,077 B2 | 3/2014 | Markosyan |
| 8,735,101 B2 | 5/2014 | Markosyan |
| 8,911,971 B2 | 12/2014 | Markosyan |
| 8,993,269 B2 | 3/2015 | Markosyan |
| 9,055,761 B2 | 6/2015 | Markosyan |
| 9,107,436 B2 | 8/2015 | Purkayastha et al. |
| 2002/1322320 | 9/2002 | Wang |
| 2002/0187232 A1 | 12/2002 | Lee |

(Continued)

FOREIGN PATENT DOCUMENTS

| | | |
|---|---|---|
| CN | 1049666 | 3/1991 |
| CN | 1100727 | 3/1995 |

(Continued)

OTHER PUBLICATIONS

Masaya Ohta et al., "Characterization of Novel Steviol Glycosides from Leaves of Stevia rebaudiana Morita", pp. 199-209, published 2010, The Japanese Society of Applied Glycoscience vol. 57.
A-Glucosyltransferase Treated Stevia, Japan's Specifications and Standards for Food Additives, VIII edition, 2009, p. 257.
Ahmed, et al., "Use of p-Bromophenacyl Bromide to Enhance Ultraviolet Detection of Water-Soluble Organic Acids (Steviolbioside and Rebaudioside B) in High-Performance Liquid Chromatographic Analysis", Journal of Chromatography, vol. 192, 1980, 387-393.
Chang, S. S. et al., "Stability Studies of Stevioside and Rebaudioside A in Carbonated Beverages", Journal of Agricultural and Food Chemistry, vol. 31, 1983, 409-412.
Chen, et al., "Enrichment and separation of rebaudioside A from stevia glycosides by a novel adsorbent with pyridyl group", Science in China, vol. 42, No. 3 1999, 277-282.

(Continued)

*Primary Examiner* — Jyoti Chawla
(74) *Attorney, Agent, or Firm* — Rachael Casey

(57) ABSTRACT

Steviol glycoside compositions having improved sweetness and flavor profiles are described.

6 Claims, 7 Drawing Sheets

(56) References Cited

U.S. PATENT DOCUMENTS

| | | |
|---|---|---|
| 2002/0197371 A1 | 12/2002 | Lee |
| 2003/0161876 A1 | 8/2003 | Hansson |
| 2003/0232118 A1 | 12/2003 | Lerchenfeld |
| 2003/0236399 A1 | 12/2003 | Zheng |
| 2006/0083838 A1 | 4/2006 | Jackson |
| 2006/0134292 A1 | 6/2006 | Abelyan |
| 2006/0142555 A1 | 6/2006 | Jonnala |
| 2007/0082102 A1 | 4/2007 | Magomet |
| 2007/0082103 A1 | 4/2007 | Magomet |
| 2007/0082106 A1 | 4/2007 | Lee |
| 2007/0116800 A1 | 5/2007 | Prakash |
| 2007/0116819 A1 | 5/2007 | Prakash |
| 2007/0116820 A1 | 5/2007 | Prakash |
| 2007/0116821 A1 | 5/2007 | Prakash |
| 2007/0116822 A1 | 5/2007 | Prakash |
| 2007/0116823 A1 | 5/2007 | Prakash |
| 2007/0116824 A1 | 5/2007 | Prakash |
| 2007/0116825 A1 | 5/2007 | Prakash |
| 2007/0116826 A1 | 5/2007 | Prakash |
| 2007/0116827 A1 | 5/2007 | Prakash |
| 2007/0116828 A1 | 5/2007 | Prakash |
| 2007/0116829 A1 | 5/2007 | Prakash |
| 2007/0116830 A1 | 5/2007 | Prakash |
| 2007/0116831 A1 | 5/2007 | Prakash |
| 2007/0116832 A1 | 5/2007 | Prakash |
| 2007/0116833 A1 | 5/2007 | Prakash |
| 2007/0116834 A1 | 5/2007 | Prakash |
| 2007/0116835 A1 | 5/2007 | Prakash |
| 2007/0116836 A1 | 5/2007 | Prakash |
| 2007/0116837 A1 | 5/2007 | Prakash |
| 2007/0116838 A1 | 5/2007 | Prakash |
| 2007/0116839 A1 | 5/2007 | Prakash |
| 2007/0116840 A1 | 5/2007 | Prakash |
| 2007/0116841 A1 | 5/2007 | Prakash |
| 2007/0128311 A1 | 6/2007 | Prakash |
| 2007/0134390 A1 | 6/2007 | Prakash |
| 2007/0134391 A1 | 6/2007 | Prakash |
| 2007/0224321 A1 | 9/2007 | Prakash |
| 2007/0292582 A1 | 12/2007 | Prakash |
| 2008/0064063 A1 | 3/2008 | Brandle |
| 2008/0102497 A1 | 5/2008 | Wong |
| 2008/0107775 A1 | 5/2008 | Prakash |
| 2008/0107776 A1 | 5/2008 | Prakash |
| 2008/0107787 A1 | 5/2008 | Prakash |
| 2008/0108710 A1 | 5/2008 | Prakash |
| 2008/0111269 A1 | 5/2008 | Politi |
| 2008/0226770 A1 | 9/2008 | Lee |
| 2008/0226797 A1 | 9/2008 | Lee |
| 2008/0292764 A1 | 11/2008 | Prakash |
| 2008/0292765 A1 | 11/2008 | Prakash |
| 2008/0292775 A1 | 11/2008 | Prakash |
| 2008/0300402 A1 | 12/2008 | Yang |
| 2009/0017185 A1 | 1/2009 | Catani |
| 2009/0053378 A1 | 2/2009 | Prakash |
| 2009/0074935 A1 | 3/2009 | Lee |
| 2009/0079935 A1 | 3/2009 | Harris |
| 2009/0104330 A1 | 4/2009 | Zasypkin |
| 2009/0142817 A1 | 6/2009 | Norman |
| 2009/0162499 A1 | 6/2009 | McArdle |
| 2009/0226590 A1 | 9/2009 | Fouache |
| 2010/0055752 A1 | 3/2010 | Kumar |
| 2010/0056472 A1 | 3/2010 | Duan |
| 2010/0099857 A1 | 4/2010 | Evans |
| 2010/0011215 A1 | 5/2010 | Abelyan |
| 2010/0057024 A1 | 5/2010 | Cavallini |
| 2010/0120710 A1 | 5/2010 | Watanabe |
| 2010/0013756 A1 | 6/2010 | Prakash et al. |
| 2010/0137569 A1 | 6/2010 | Prakash |
| 2010/0018986 A1 | 7/2010 | Abelyan et al. |
| 2010/0166679 A1 | 7/2010 | Abelyan |
| 2010/0189861 A1 | 7/2010 | Abelyan |
| 2010/0227034 A1 | 9/2010 | Purkayastha |
| 2010/0255171 A1 | 10/2010 | Purkayastha |
| 2010/0278993 A1 | 11/2010 | Prakash |
| 2010/0316782 A1 | 12/2010 | Shi |
| 2011/0030457 A1 | 2/2011 | Valery |
| 2011/0033525 A1 | 2/2011 | Lui |
| 2011/0092684 A1 | 4/2011 | Abelyan |
| 2011/0104353 A1 | 5/2011 | Lee |
| 2011/0111115 A1 | 5/2011 | Shi |
| 2011/0124587 A1 | 5/2011 | Jackson |
| 2011/0163011 A1 | 6/2011 | Prakash |
| 2011/0183056 A1 | 7/2011 | Morita |
| 2011/0189360 A1 | 8/2011 | Yoo |
| 2011/0195169 A1 | 8/2011 | Markosyan |
| 2011/0224168 A1 | 9/2011 | Szente |
| 2012/0157553 A1 | 6/2012 | Dewis |
| 2012/0164678 A1 | 6/2012 | Stephanopoulos |
| 2012/0214751 A1 | 8/2012 | Markosyan |
| 2012/0214752 A1 | 8/2012 | Markosyan |
| 2012/0301589 A1 | 11/2012 | Markosyan |
| 2013/0030060 A1 | 1/2013 | Markosyan |
| 2013/0064955 A1 | 3/2013 | Miquel et al. |
| 2013/0071339 A1 | 3/2013 | Markosyan |
| 2013/0347140 A1 | 12/2013 | Wang |
| 2014/0017378 A1 | 1/2014 | Purkayastha et al. |
| 2014/0227421 A1* | 8/2014 | Markosyan ............ C12P 33/00 426/583 |
| 2014/0271996 A1 | 9/2014 | Prakash |
| 2014/0357588 A1 | 12/2014 | Markosyan |
| 2015/0031868 A1 | 1/2015 | Lehmann |
| 2015/0141632 A1 | 5/2015 | Markosyan |
| 2015/0157045 A1 | 6/2015 | Markosyan |
| 2015/0257424 A1 | 9/2015 | Catani et al. |
| 2017/0190728 A1 | 7/2017 | Markosyan |
| 2018/0079767 A1 | 3/2018 | Markosyan et al. |

FOREIGN PATENT DOCUMENTS

| | | | |
|---|---|---|---|
| CN | 1112565 | 11/1995 | |
| CN | 1192447 | 9/1998 | |
| CN | 1238341 | 5/2002 | |
| CN | 1349997 | 5/2002 | |
| CN | 101200480 | 6/2008 | |
| CN | 101591365 | 12/2009 | |
| CN | 101628924 | 1/2010 | |
| EP | 0957178 | 4/1999 | |
| EP | 2350110 | * 3/2011 | ........... C07H 15/256 |
| EP | 2433505 | 3/2012 | |
| EP | 2510800 | 10/2012 | |
| JP | 52005800 | 1/1977 | |
| JP | 52083731 | 7/1977 | |
| JP | 52100500 | 8/1977 | |
| JP | 52136200 | 11/1977 | |
| JP | 54030199 | 3/1979 | |
| JP | 54132599 | 10/1979 | |
| JP | 55039731 | 3/1980 | |
| JP | 55081567 | 6/1980 | |
| JP | 55092400 | 7/1980 | |
| JP | 55120770 | 9/1980 | |
| JP | 55138372 | 10/1980 | |
| JP | 55159770 | 12/1980 | |
| JP | 55162953 | 12/1980 | |
| JP | 56099768 | 8/1981 | |
| JP | 56109568 | 8/1981 | |
| JP | 56121453 | 9/1981 | |
| JP | 56121454 | 9/1981 | |
| JP | 56121455 | 9/1981 | |
| JP | 56160962 | 12/1981 | |
| JP | 57002656 | 1/1982 | |
| JP | 57005663 | 1/1982 | |
| JP | 57046998 | 3/1982 | |
| JP | 57075992 | 5/1982 | |
| JP | 57086264 | 5/1982 | |
| JP | 58020170 | 2/1983 | |
| JP | 58028246 | 2/1983 | |
| JP | 58028247 | 2/1983 | |
| JP | 58212759 | 12/1983 | |
| JP | 58212760 | 12/1983 | |
| JP | 59045848 | 3/1984 | |
| JP | 62166861 | 7/1987 | |
| JP | 63173531 | 7/1988 | |
| JP | 1131191 | 5/1989 | |
| JP | 3262458 | 11/1991 | |

(56) References Cited

FOREIGN PATENT DOCUMENTS

| | | |
|---|---|---|
| JP | 6007108 | 1/1994 |
| JP | 6192283 | 7/1994 |
| JP | 7143860 | 6/1995 |
| JP | 7177862 | 7/1995 |
| JP | 8000214 | 1/1996 |
| JP | 9107913 | 4/1997 |
| JP | 2000236842 | 9/2000 |
| JP | 2000270804 | 10/2000 |
| JP | 2002262822 | 9/2002 |
| JP | 2010516764 | 5/2010 |
| KR | 20070067199 | 6/2007 |
| KR | 20080071605 | 8/2008 |
| KR | 20090021386 | 3/2009 |
| RU | 2111969 | 5/1998 |
| RU | 2123267 | 12/1998 |
| RU | 2156083 | 9/2000 |
| RU | 2167544 | 5/2001 |
| RU | 2198548 | 2/2003 |
| WO | WO2002087359 | 11/2002 |
| WO | WO2005089483 | 9/2005 |
| WO | WO2006072878 | 7/2006 |
| WO | WO2006072879 | 7/2006 |
| WO | WO2007061795 | 5/2007 |
| WO | WO2008091547 | 7/2008 |
| WO | WO2008112966 | 9/2008 |
| WO | WO2009071277 | 6/2009 |
| WO | WO2009108680 | 9/2009 |
| WO | WO2009140394 | 11/2009 |
| WO | WO2010038911 | 4/2010 |
| WO | WO2010118218 | 10/2010 |
| WO | WO2010146463 | 12/2010 |
| WO | WO2011046423 | 4/2011 |
| WO | WO2011059954 | 5/2011 |
| WO | WO2011097359 | 8/2011 |
| WO | WO2011112892 | 9/2011 |
| WO | WO2011153378 | 12/2011 |
| WO | WO2012006728 | 1/2012 |
| WO | WO2012082493 | 6/2012 |
| WO | WO2012082677 | 6/2012 |
| WO | WO2012088593 | 7/2012 |
| WO | WO2012102769 | 8/2012 |
| WO | WO2012112180 | 8/2012 |
| WO | WO2012125991 | 9/2012 |
| WO | WO2012129451 | 9/2012 |
| WO | WO-2012129451 A1 * | 9/2012 ............. C12P 19/18 |
| WO | WO2012166163 | 12/2012 |
| WO | WO2012166164 | 12/2012 |
| WO | WO2012177727 | 12/2012 |
| WO | WO2013022989 | 2/2013 |
| WO | WO2014122328 | 2/2013 |
| WO | WO2013096420 | 6/2013 |
| WO | WO2013110673 | 8/2013 |
| WO | WO2013176738 | 11/2013 |
| WO | WO2014086890 | 6/2014 |
| WO | WO2014122227 | 8/2014 |
| WO | WO2014146089 | 9/2014 |
| WO | WO2014146135 | 9/2014 |
| WO | 2014/197898 A1 | 12/2014 |
| WO | WO2014193888 | 12/2014 |
| WO | WO2014197898 | 12/2014 |
| WO | 2015/023928 A1 | 2/2015 |
| WO | WO2015023928 | 2/2015 |
| WO | WO2015152707 | 10/2015 |
| WO | WO2016023103 | 2/2016 |
| WO | WO2016034942 | 3/2016 |
| WO | WO2016100689 | 6/2016 |
| WO | WO2016143361 | 9/2016 |
| WO | WO2016187559 | 11/2016 |
| WO | WO2017031301 | 2/2017 |
| WO | WO2017059414 | 4/2017 |
| WO | WO2017160846 | 9/2017 |

OTHER PUBLICATIONS

Chen, et al., "Selectivity of polymer adsorbent in adsorptive separations of stevia diterpene glycisides", Science in China, vol. 41, No. 4 1998 , 436-441.
Chen, et al., "Studies on the adsorptive selectivity of the polar resin with carbonyl group on rebaudioside A", Acta Polymeric Scnica, No. 4 1999 , 398-403.
Crammer, et al., "Sweet glycosides from the Stevia plant", Chemistry in Britain, Oct. 1986, 915-916, 918.
Chatsudthipong, et al. Stevioside and related compounds: Therapeutic benefits beyond sweetness, pp. 41-45 Pharmacology & Therapeutics 121 (2009).
Darise et al., "Enzymic Transglucosylation of Rubusoside and the Structure-Sweetness Relationship of Steviol Bisglycosides," Agric. Biol. Chem. vol. 48(10), 1984, 2483-2488.
Dubois et al., "Diterpenoid Sweeteners. Synthesis and Sensory Evaluation of Stevioside Analogues with Improved Organoleptic Properties," J. Med. Chem. vol. 28, (1985) 93-98.
Espinoza et al., "Identification, Quantification, and Sensory Characterization of Steviol Glycosides from Differently Processed Stevia rebaudiana Commercial Extracts", Agric. Food Chem. 2014 62, 11797-11804, pp. 1-8.
FAO/WHO "Combined Compendium of Food Additive Specifications" FAO JECFA Monographs 1, vol. 4, 2006, Food and Agricultural Organization of the United Nations, Rome, pp. 1-204.
Fuh, "Purification of steviosides by membrane and ion exchange process", Journal of Food Science, vol. 55, No. 5 1990, 1454-1457.
Fukunaga et al., "Enzymic Transglucosylation Products of Stevioside: Separation and Sweetness-evaluation," Agric. Biol. Chem. vol. 53(6) (1989) 1603-1607.
Fullas et al., "Separation of natural product sweetening agents using overpressured layer chromatography," Journal of Chromatography vol. 464 (1989) 213-219.
Hale, et al., "Amylase of Bacillus Macerans", Cereal Chemistry, vol. 28, No. 1, Jan. 1951, 49-58.
Ibrahim et al., "Minor Diterpene Glycosides from the Leaves of Stevia Rebaudiana", J. Nat. Prod., 2014, 77, 1231-1235.
International Search Report and Written Opinion of PCT/US2010/055960, pp. 1-11 dated Jan. 2011.
International Search Report and Written Opinion of PCT/US2011/028028, pp. 1-8 dated May 2011.
International Search Report and Written Opinion of PCT/US2011/033734, pp. 1-8 dated Jul. 2011.
International Search Report and Written Opinion of PCT/US2011/033737, pp. 1-8 dated Jul. 2011.
International Search Report and Written Opinion of PCT/US2011/033912, pp. 1-6 dated Jul. 2011.
International Search Report and Written Opinion of PCT/US2011/035173, pp. 1-7 dated Jul. 2011.
International Search Report and Written Opinion of PCT/US2011/036063, pp. 1-6 dated Aug. 2011.
International Search Report and Written Opinion of PCT/US2011/047498, pp. 1-7 dated Dec. 2011.
International Search Report and Written Opinion of PCT/US2011/047499, pp. 1-7 dated Dec. 2011.
International Search Report and Written Opinion of PCT/US2011/064343, pp. 1-17 dated Dec. 2011.
International Search Report and Written Opinion of PCT/US2012/024585, pp. 1-8 dated Jun. 2012.
International Search Report and Written Opinion of PCT/US2012/024722, pp. 1-8 dated May 2012
International Search Report and Written Opinion of PCT/US2012/030210, pp. 1-9 dated Jul. 2012.
International Search Report and Written Opinion of PCT/US2012/043294, pp. 1-7 dated Sep. 2012.
International Search Report and Written Opinion of PCT/US2012/051163, pp. 1-9 dated Oct. 2012.
International Search Report and Written Opinion of PCT/US2012/052659, pp. 1-9 dated Nov. 2012.
International Search Report and Written Opinion of PCT/US2012/052665, pp. 1-8 dated Nov. 2012.
International Search Report and Written Opinion of PCT/US2014/041548, pp. 1-8 dated Oct. 2014.

(56) References Cited

OTHER PUBLICATIONS

International Search Report and Written Opinion of PCT/US2014/056451, pp. 1-10 dated Feb. 2015.
International Search Report and Written Opinion of PCT/US2016/058834, pp. 1-7 dated Jan. 2017.
International Search Report and Written Opinion of PCT/US2015/047234, pp. 1-7 dated Nov. 2015.
International Search Report and Written Opinion of PCT/US2018/053258, pp. 1-9 dated Nov. 2018.
Gorden et al. ("Supersaturation" Access Science McGraw Hill 2008, p. 1, http://www.accessscience.com/content/supersaturation/670000).
Hartel, Richard "Crystallization in Foods" Handbook of Industrial Crystallization Elsevier 2002, pp. 287 and 293-296.
"Recrystallization Technique: Proper purification of crystalline solids". Available online as of Dec. 4, 2009 from www.erowid.org. pp. 1-3.
Huang, X Y, et al. "Preparative isolation and purification of steviol glycosides from Stevia rebaudiana Bertoni using high-speed countercurrent chromatogoraphy" Separation and Purification Technology Elsevier Science, Netherlands, vol. 71, No. 2, 2010, p. 220-224.
Jaitak, et al., "An Efficient Microwave-assisted Extraction Process of Stevioside and Rebaudioside—A from Stevia Rebaudiana (Bertoni)", Phytochem. Anal. vol. 20 2009, 240-245.
Kennelly, "Sweet and non-sweet constituents of Stevia rebaudiana", Stevia: The genus Stevia, Taylor & Francis, 2002, 68-85.
Kinghorn, "Overview", Stevia: The genus *Stevia*, Taylor & Francis, 2002, 1-17.
Kitahata, S. et al., "Production of Rubusoside Derivatives by Transgalactosylation of Various b-Galactosidases" Agric. Biol. Chem., vol. 53, No. 11 1989, 2923-2928.
Kobayashi, et al., "Dulcoside A and B, New diterpene glycosides from Stevia Rebaudiana", Phytochemistry, vol. 16 1977, 1405-1408.
Kochikyan ,et al. ,"Combined Enzymatic Modification of Stevioside and Rebaudioside A", Applied Biochemistry and Microbiology, vol. 42, No. 1, 2006, 31-37.
Kohda, et al., "New sweet diterpene glucosides from Stevia Rebaudiana", Phytochemistry, vol. 15 1976 , 981-983.
Kovylyaeva, et al., "Glycosides from Stevia rebaudiana", Chemistry of Natural Compounds, vol. 43, No. 1 2007, 81-85.
Li, Sha et al.; "Transglycosylation of stevioside to improve the edulcorant quality by lower substitution using cornstarch hydrolysate and CGTase", Food Chemistry, vol. 138, No. 2, Nov. 12, 2012, pp. 2064-2069, XP028977479, ISSN: 0308-8146, DOI: 10.1016/J.FOODCHEM.2012.10.124.
Liu, et al., "Study of stevioside preparation by membrane separation process", Desalination, vol. 83 1991, 375-382.
Lobov, S. V. et al., "Enzymic Production of Sweet Stevioside Derivatives: Transglucosylation of Glucosidases", Agric. Biol. Chem., vol. 55, No. 12 1991, 2959-2965.
Montovaneli, et al., "The effect of temperature and flow rate on the clarification of the aqueous Stevia-extract in fixed-bed column with zeolites", Brazilian Journal of Chemical Engineering, vol. 21, No. 3 2004 , 449-458.
Moraes, et al., "Clarification of Stevia rebaudiana (Bert.) Bertoni extract adsorption in modified zeolites", Acta Scientiarum, vol. 23, No. 6 2001, 1375-1380.
News Bites, GLG announces high purity REB M GRAS notification with FDA. Consumer Durables & Apparel Melbourne. Apr. 15, 2014. pp. 1-2. especially, p. 1, para 5; p. 2, para 1.
Ohio "14.0 Spray Drying and Spray Dryers", pp. 1-10, http://class.fst.ohio-state-edu/Dairy_Tech/14Spraydrying.htm Nov. 2, 2009 as obtained by internetarchive.org.
Ohta et al., "Characterization of Novel Steviol Glycosides from Leaves of Stevia rebaudiana Morita," J. Appl. Glycosi., vol. 57, 199-209, 2010.

Ohtani et al. "Chapter 7. Methods to improve the taste of the sweet principles of Stevia rebaudiana." The Genus *Stevia*, edited by A. Douglas Kinghorn, CRC Press 2001, Taylor and Francis, London and New York, pp. 138-159.
Philips, K.C. "Stevia: steps in developing a new sweetener", In T.H. Grenby, Editor, Developments in Sweeteners-3, Elsevier 1987, 1-43.
Pol, et al., "Comparison of two different solvents employed for pressurised fluid extraction of stevioside from Stevia rebaudiana: methanol versus water", Anal Bioanal Chem vol. 388 2007 , 1847-1857.
Pol, et al., "Characterisation of Stevia Rebaudiana by comprehensive two-dimensional liquid chromatography time-of-flight mass spectrometry," Journal of Chromatography A, 1150 (2007) 85-92.
Prakash et al., "Development of rebiana, a natural, non-caloric sweetener," Jul. 1, 2008, Food and Chemical Toxology, vol. 46, Is. 7, Sup. 1, p. S75-S82.
Prakash et al. "Isolation and Characterization of a Novel Rebaudioside M Isomer from a Bioconversion Reaction of Rebaudioside A and NMR Comparison Studies of Rebaudioside M Isolated from Stevia rebaudiana Bertoni and Stevia rebaudiana Morita," Biomolecules, vol. 4, 2014, 374-389, p. 385 para 5.
Prakash et al., "Development of Next Generation Stevia Sweetener: Rebaudioside M" Foods 2014, 3, 162-175, ISSN 2304-8158.
Ramirez, I.; "Glucose polymer taste is not unitary for rats", Physiology & Behaviour, 1994, 55(2), pp. 355-360 (Abstract only).
Rebaudioside A and Stevia Extract, Internet Citation, 2007 http://emperorsherbologist.com/rebaudioside a.php. p. 1-3.
Richman et al., "Fuctional genomics uncovers three glucosyltransferases involved in the synthesis of the major sweet glucosides of Stevia rebaudiana," The Plant Journal, vol. 41 (2005) 56-67.
Sakamoto et al., "Application of 13C NMR Spectroscopy to Chemistry of Natural Glycosides: Rebaudioside-C, a New Sweet Diterpene Glycoside of Stevia Rebaudiana", Chem. Pharm. Bull., vol. 25, 1977, 844-846.
Shi, et al. "Synthesis of bifuntional polymeric adsorbent and its application in purification of Stevia glycosides", Reactive & functional Polymers, vol. 50 2002, 107-116.
Shibata et al. "Glucosylation of Steviol and Steviol-Glucosides in Extracts from Stevia rebaudiana Bertoni," Plant Physiol, vol. 95,(1991) 152-156.
Starratt, et al. "Rebaudioside F, a diterpene glycoside from Stevia Rebaudiana", Phytochemistry, vol. 59 2002, 367-370.
Sweet Green Fields, LLC "Notice to the U.S. Food and Drug Administration (FDA) that the use of Rebiana (Rebaudiosid A) derived from Stevia rebaudiana, as a Food Ingredient is Generally Recognized as Safe (GRAS)," Jan. 15, 2009, http:/www.accessdata.fda.gov/scripts/fcn/gras_notices/grn000282.pdf (obtained from the Web on May 8, 2012) entire document esp. p. 22, Table 1, pp. 1-97.
Tanaka, O.; "Improvement of taste of natural sweeteners," Pure & Appl. Chem., vol. 69, No. 4 1997, 675-683.
Teo, et al. "Validation of green-solvent extraction combined with Chromatographic chemical fingerprint to evaluate quality of Stevia reaudiana Bertoni", J. Sep. Sci, vol. 32 2009, 613-622.
Toyo sugar, "GRAS Exemption Claim for a-Glucosylated Steviol Glycosides" Office of Food Additive Safety. Feb. 23, 2011, pp. 1-51.
United Nations' Food and Agriculture Organization/Joint Expert Committee on Food Additives (2010) Steviol Glycosides, Compendium of Food Additive Specifications, FAO JECFA Monographs 10, 17-21, pp. 1-5.
UN "Steviol Glycosides" JECFA 2008 pp. 1-4, UN "Steviol Glycosides" JECFA 2008 pp. 1-4 http://www.fao.org/ag/agn/jecfa-additives/specs/monograph5/additive-442-m5.pdf.
Van der Maarel et al., "Properties and applications of starch-converting enzymes of the a-amylase family," Journal of Biotechnology, vol. 94 (220) 137-155.
Vasquez et al., Stimulation of the Gerbil's Gustatory Receptors by Some Potently Sweet Terpenoids, J. Agric. Food Chem., vol. 41, 1305-1310, 1993.
Wallin, "Steviol glycosides," 2004, XP002740430 ftp://ftp.fao.org/es/esn/jecfa/cta/CTA63_Steviol.pdf, pp. 1, 4, 5. Retrieved 2015.

(56) References Cited

OTHER PUBLICATIONS

Yamamoto, K. et al., "Effective Production of Glycosyl-steviosides by a-1, 6 Transglucosylation of Dextrin Dextranase", Biosci. Biotech. Biochem. vol. 58, No. 9 1994, 1657-1661.

Ye, et al. "Modification of stevioside using transglucosylation activity of Bacilllus amyloliquefaciens a-amylase to reduce its bitter aftertaste," LWT—Food Science and Technology, vol. 51, Issue 1, May 2013, pp. 524-530.

Yoshikawa, et al. "Transglycosylation of Mogroside V, a Triterpene Glycoside in *Siraitia grosvenori*, by Cyclodextrin Glucanotransferase and Improvement of the Qualities of Sweetness," The Japanese Society of Applied Glycoscience, vol. 52, No. 3, 2005, p. 247-252.

Yoda, et al. "Supercritical fluid extraction from Stevia rebaudiana Bertoni using CO2 and CO2+ water: extraction kinetics and identification of extracted components", Journal of Food Engineering, vol. 57 2003, 125-134.

Remington: The Science and Practice of Pharmacy, 21st Edition. The University of the Sciences in Philadelphia, 2006. Part 5, p. 700.

Zell, et al. "Investigation of Polymorphism in Aspartame and Neotame Using Solid-State NMR Spectroscopy", Tetrahedron, vol. 56, 2000, 6603-6616.

"Methanol". Available online from Sigma-Aldrich as of Jan. 4, 2016. pp. 1-2.

"Acetone". Available online from Sigma-Aldrich as of Jan. 4, 2016. pp. 1-2.

Zhang, et al. "Membrane-based separation schemem for processing sweetener from Stevia leaves", Food Research International, vol. 33 2000, 617-620.

\* cited by examiner

800ppm of 50/50 Reb M/Reb D blend in diet lemon-lime carbonated soft drink (first bars)

1300ppm of GSG containing 19% glycosylated Reb Q and 18% glycosylated Reb R in diet lemon-lime carbonated soft drink (second bars)

STEVIOL GLYCOSIDE COMPOSITIONS

BACKGROUND OF THE INVENTION

The invention is directed to the positive impact of minor steviol glycosides on the sweetness profile of *Stevia* sweeteners.

Sugar alternatives are receiving increasing attention due to awareness of many diseases in conjunction with consumption of high-sugar foods and beverages. However, many artificial sweeteners such as dulcin, sodium cyclamate and saccharin were banned or restricted in some countries due to concerns on their safety. Therefore non-caloric sweeteners of natural origin are becoming increasingly popular. The sweet herb *Stevia rebaudiana* produces a number of diterpene glycosides which feature high intensity sweetness and sensory properties superior to those of many other high potency sweeteners.

*Stevia rebaudiana* is a plant species belonging to the Astracea family, and is native to South America and cultivated now in many parts of the world (Gardana et al., 2003; Koyama et al., 2003; Carakostas et al., 2008). *Stevia* leaves are naturally sweet, and have been used for sweetening food products for hundreds of years in South America (Soejarto et al., 1982). Extracts of *Stevia rebaudiana* have been used commercially to sweeten foods in Japan and other Southeast Asian countries for a number of years (Koyama et al., 2003). As a product of nature, the *Stevia* plant leaves contain different sweet tasting components, called steviol glycosides. Reportedly, more than 40 steviol glycosides have been identified that are typically present in the *Stevia* leaf extract (Ceunen and Geuns, 2013; Chaturvedula et al., 2011a,b,c; Chaturvedula and Prakash, 2011a,b; Ohta et al., 2010). Each of these steviol glycosides has its own unique taste profile and sweetness intensity, which can be up to 350 times sweeter than sugar, but all share a similar molecular structure where different sugar moieties are attached to aglycone steviol (an ent-kaurene-type diterpene). The generic structure of the steviol glycosides is presented in FIG. 1.

Rebaudioside A and stevioside have garnered the most commercial interest and have been extensively studied and characterized in terms of their suitability as commercial high intensity sweeteners. Stability studies in carbonated beverages confirmed their heat and pH stability (Chang S. S., Cook, J. M. (1983) Stability studies of stevioside and rebaudioside A in carbonated beverages. J. Agric. Food Chem. 31: 409-412.)

Steviol glycosides differ from each other not only by molecular structure, but also by their taste properties. Usually stevioside is found to be 110-270 times sweeter than sucrose and rebaudioside A is between 150 and 320 times sweeter than sucrose. Rebaudioside A has the least astringent, the least bitter, and the least persistent aftertaste thus possessing the most favorable sensory attributes in major steviol glycosides (Tanaka O. (1987) Improvement of taste of natural sweeteners. *Pure Appl. Chem.* 69:675-683; Phillips K. C. (1989) *Stevia*: steps in developing a new sweetener. In: Grenby T. H. ed. Developments in sweeteners, vol. 3. Elsevier Applied Science, London. 1-43.)

By the early 21st century, only a limited number of the chemical structures of steviol glycosides in *Stevia rebaudiana* have been characterized including stevioside, rebaudioside A-F, dulcoside A, and steviolbioside (Ceunen and Geuns, 2013). In recent years, many minor steviol glycosides with diverse chemical structures, have been reported from the leaves of *Stevia rebaudiana* (Chaturvedula et al., 2011a,b,c; Chaturvedula and Prakash, 2011 a,b). These diverse steviol glycosides, which are ent-kaurene-type diterpenes, are connected to various sugars such as glucose, rhamnose, xylose, fructose and deoxy glucose at C-13 and C-19 positions via 1,2-; 1,3-; 1,4- or 1,6-α or β-glycosidic linkages. The identity and grouping of various steviol glycosides is summarized in Table 1. Due to the large number of steviol glycosides, Table 1 lists the steviol glycosides in 5 groups depending on the sugar moieties connected to the steviol backbone and identified with abbreviated compositional names.

Glucosyl steviol family: comprising only steviol and glucose residues. This group can be presented by general formula "SvGn", wherein Sv is the steviol and G is glucose.

Rhamnosyl steviol family: comprising steviol, rhamose and glucose residues. This group can be presented by general formula "SvR1Gn", wherein R is the Rhamnose.

Xylosyl steviol family: comprising steviol, xylose and glucose residues. This group can be presented by general formula "SvX1Gn", wherein X is the Xylose.

Fructosyl steviol family: comprising steviol, fructose and glucose residues. This group can be presented by general formula "SvF1Gn", wherein F is the Fructose.

Deoxyglucose steviol family: comprising steviol, deoxyglucose and glucose residue. This group can be presented by general formula SvdG1Gn.

TABLE 1

| # | Common Name | Abbr. Formula | $R_1$ | $R_2$ |
|---|---|---|---|---|
| | | 1) Steviol + Glucose (SvGn) | | |
| 1.1 | Steviolmonoside | SvG1 | H | Glcβ1- |
| 1.2 | Steviol-19-O-β-D-glucoside | SvG1 | Glcβ1- | H |
| 1.3 | Rubusoside | SvG2 | Glcβ1- | Glcβ1- |
| 1.4 | Steviolbioside | SvG2 | H | Glcβ(1-2)Glcβ1- |
| 1.5 | Stevioside | SvG3 | Glcβ1- | Glcβ(1-2)Glcβ1- |
| 1.6 | Stevioside A | SvG3 | Glcβ(1-2)Glcβ1- | Glcβ1- |
| 1.7 | Rebaudioside B | SvG3 | H | Glcβ(1-2)[Glcβ(1-3)]Glcβ1- |
| 1.8 | Rebaudioside G | SvG3 | Glcβ1- | Glcβ(1-3)Glcβ1- |
| 1.9 | Stevioside B | SvG3 | Glcβ(1-3)Glcβ1- | Glcβ1- |
| 1.10 | Rebaudioside E | SvG4 | Glcβ(1-2)Glcβ1- | Glcβ(1-2)Glcβ1- |
| 1.11 | Rebaudioside A | SvG4 | Glcβ1- | Glcβ(1-2)[Glcβ(1-3)]Glcβ1- |
| 1.12 | Rebaudioside A2 | SvG4 | Glcβ1- | Glcβ(1-6)Glcβ(1-2)Glcβ1- |

TABLE 1-continued

| # | Common Name | Abbr. Formula | $R_1$ | $R_2$ |
|---|---|---|---|---|
| 1.13 | Rebaudioside D | SvG5 | Glcβ(1-2)Glcβ1- | Glcβ(1-2)[Glcβ(1-3)]Glcβ1- |
| 1.14 | Rebaudioside I | SvG5 | Glcβ(1-3)Glcβ1- | Glcβ(1-2)[Glcβ(1-3)]Glcβ1- |
| 1.15 | Rebaudioside L | SvG5 | Glcβ1- | Glcβ(1-6)Glcβ(1-2)[Glcβ(1-3)]Glcβ1- |
| 1.16 | Rebaudioside Q2 | SvG5 | Glcα(1-2)Glcα(1-4)Glcβ1- | Glcβ(1-2)Glcβ1- |
| 1.17 | Rebaudioside Q | SvG5 | Glcβ1- | Glcα(1-4)Glcβ(1-2)[Glcβ(1-3)]Glcβ1- |
| 1.18 | Rebaudioside I2 | SvG5 | Glcβ1- | Glcα(1-3)Glcβ(1-2)[Glcβ(1-3)]Glcβ1- |
| 1.19 | Rebaudioside Q3 | SvG5 | Glcβ1- | Glcα(1-4)Glcβ(1-3)[Glcβ(1-2)]Glcβ1- |
| 1.20 | Rebaudioside I3 | SvG5 | Glcβ(1-2)[Glcβ(1-6)]Glcβ1- | Glcβ(1-2)Glcβ1- |
| 1.21 | Rebaudioside M | SvG6 | Glcβ(1-2)[Glcβ(1-3)]Glcβ1- | Glcβ(1-2)[Glcβ(1-3)]Glcβ1- |
| 2) Steviol + Rhamnose + Glucose (SvR1Gn) | | | | |
| 2.1 | Dulcoside A | SvR1G2 | Glcβ1- | Rhaα(1-2)Glcβ1- |
| 2.2 | Dulcoside B | SvR1G2 | H | Rhaα(1-2)[Glcβ(1-3)]Glcβ1- |
| 2.3 | Rebaudioside C | SvR1G3 | Glcβ1- | Rhaα(1-2)[Glcβ(1-3)]Glcβ1- |
| 2.4 | Rebaudioside C (isomer) | SvR1G3 | Rhaα(1-2)Glcβ1- | Glcβ(1-3)Glcβ1- |
| 2.5 | Rebaudioside H | SvR1G4 | Glcβ1- | Glcβ(1-3)Rhaβ(1-2)[Glcβ(1-3)]Glcβ1- |
| 2.6 | Rebaudioside K | SvR1G4 | Glcβ(1-2)Glcβ1- | Rhaα(1-2)[Glcβ(1-3)]Glcβ1- |
| 2.7 | Rebaudioside J | SvR1G4 | Rhaα(1-2)Glcβ1- | Glcβ(1-2)[Glcβ(1-3)]Glcβ1- |
| 2.8 | Rebaudioside N | SvR1G5 | Rhaα(1-2)[Glcβ(1-3)]Glcβ1- | Glcβ(1-2)[Glcβ(1-3)]Glcβ1- |
| 2.9 | Rebaudioside O | SvR1G6 | Glcβ(1-3)Rhaα(1-2)[Glcβ(1-3)]Glcβ1- | Glcβ(1-2)[Glcβ(1-3)]Glcβ1- |
| 3) Steviol + Xylose + Glucose (SvX1Gn) | | | | |
| 3.1 | Stevioside F | SvX1G2 | Glcβ1- | Xylβ(1-2)Glcβ1- |
| 3.2 | Rebaudioside F | SvX1G3 | Glcβ1- | Xylβ(1-2)[Glc(1-3)]Glcβ1- |
| 3.3 | Rebaudioside F2 | SvX1G3 | Glcβ1- | Glcβ(1-2)[Xylβ(1-3)]Glcβ1- |
| 3.4 | Rebaudioside F3 | SvX1G3 | Xylβ(1-6)Glcβ1- | Glcβ(1-2)Glcβ1- |
| 4) Steviol + Fructose + Glucose (SvF1Gn) | | | | |
| 4.1 | Rebaudioside A3 | SvF1G3 | Glcβ1- | Glcβ(1-2)[Fruβ(1-3)]Glcβ1- |
| 5) Steviol + deoxyGlucose + Glucose (SvdG1Gn) | | | | |
| 5.1 | Stevioside D | SvdG1G2 | Glcβ1- | 6-deoxyGlcβ(1-2)Glcβ1- |
| 5.2 | Stevisoide E | SvdG1G3 | Glcβ1- | 6-deoxyGlcβ(1-2)[Glcβ(1-3)]Glcβ1- |
| 5.3 | Stevioside E2 | SvdG1G3 | 6-deoxyGlcβ1- | Glcβ(1-2)[Glcβ(1-3)]Glcβ1- |

SUMMARY OF THE INVENTION

The present invention is directed to improving the sweetness profile of steviol glycoside sweeteners, such as stevioside and Rebaudioside A (Reb A). It was unexpectedly discovered that certain minor steviol glycosides have a favorable impact on the sweetness profile of other steviol glycosides, including Rebaudioside D (Reb D) and Rebaudioside M (Reb M). These minor steviol glycosides, although present in small amounts, demonstrate statistically significant positive impacts on the sweetness profile of *Stevia* sweeteners. As used herein, a minor steviol glycoside is one that is present in a composition in an amount less than 5%, or less than 3%.

DETAILED DESCRIPTION

Figure 1:
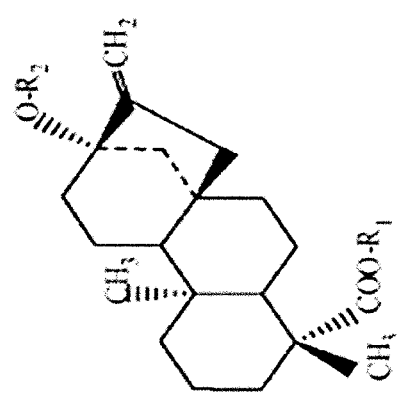
FIG. 1 shows the generic structure of steviol glycosides.

Steviol glycoside compositions including minor glycosides (SG compositions), such as Rebaudioside N and Rebaudioside O, were found to have a positive impact on the sweetness profile of *Stevia* sweeteners. An exemplary steviol glycoside composition is described in Table 2.

TABLE 2

Steviol Glycoside Composition (SG Composition)

| Molecules | Structure | Steviol Glycoside Composition |
|---|---|---|
| Reb D | SvG5 | 63.95 |
| Reb M | SvG6 | 25.37 |
| Reb N | SvR1G5 | 2.95 |
| Reb O | SvR1G6 | 1.37 |
| Reb A | SvG4 | 1.32 |
| Reb E | SvG4 | 0.86 |
| Reb B | SvG3 | 0.22 |
| Stevioside | SvG3 | 0.03 |
| Reb C | SvR1G3 | 0.01 |
| Reb F | SvX1G3 | 0 |
| Dulcoside A | SvR1G2 | 0 |
| Rubusoside | SvG2 | 0 |
| Steviolbioside | SvG2 | 0 |
| Total Steviol Glycosides | | 96.07 |

Comparison of Reb D/Reb M Blends to Steviol Glycoside Compositions

Example 1: Acidified Water—5 Brix Target 15 panelists tested the sample solutions, as summarized in Table 3:

TABLE 3

Acidified water 5 brix target - SG Composition vs Reb D and Reb M blends
Summary of Mean-Scores, P-Values, and Significance

| Attribute | 5% Sugar | 200 ppm of SG Composition | 200 ppm of 70/30 Reb D/Reb M blend | P-Value | Sig |
|---|---|---|---|---|---|
| Sweetness | 4.91 | 4.86 | 4.98 | 0.0997 | |
| Bitterness | b<br>0.75 | ab<br>0.98 | a<br>1.23 | 0.0083 | *** |
| Astringency | b<br>0.84 | b<br>1.02 | a<br>1.77 | 0.0035 | *** |
| Acidity | c<br>0.99 | b<br>1.41 | a<br>1.99 | 0.0012 | *** |
| Off-Note (Metallic/Licorice) | b<br>0.52 | b<br>0.61 | a<br>1.13 | 0.0081 | *** |

TABLE 3-continued

Acidified water 5 brix target - SG Composition vs Reb D and Reb M blends
Summary of Mean-Scores, P-Values, and Significance

| Attribute | 5% Sugar | 200 ppm of SG Composition | 200 ppm of 70/30 Reb D/Reb M blend | P-Value | Sig |
|---|---|---|---|---|---|
| Sweet Aftertaste | c<br>0.56 | b<br>0.99 | a<br>1.38 | 0.0046 | *** |
| Bitter Aftertaste | 0.33 | 0.37 | 0.53 | 0.5487 | NS |
| Overall Liking | a<br>4.96 | b<br>4.53 | b<br>4.46 | 0.1964 | * |

*= 80% confidence interval,
**= 90% Confidence interval,
***= 95% Confidence interval As can be seen, the steviol glycoside composition (SG composition) has many attributes that are more similar to a 5% sugar solution than a Reb D/Reb M blend, and the overall liking is greater than the Reb D/Reb M blend. Steviol glycoside compositions with minor glycosides and a 70/30 Reb D/M blend were parity in sweetness. The Reb D/Reb M 70/30 blend had significantly higher astringency, acidity, off-notes, and sweet aftertaste compared to the SG composition. The two samples have significantly different flavor profiles.

Example 2: Acidified Water—10 Brix Target

The same test was done as in Example 1, but with a 10 Brix target. 13 panelists tested the solutions, as summarized in Table 4.

TABLE 4

Acidified water 10 brix target - SG Composition vs Reb D and Reb M blends
Summary of Mean-Scores, P-Values, and Significance

| Attribute | 10% Sugar | 900 ppm of SG Composition | 900 ppm of 70/30 Reb D/Reb M | P-Value | Sig |
|---|---|---|---|---|---|
| Sweetness | 8.45 | 8.62 | 8.45 | 0.8794 | NS |
| Bitterness | b<br>0.55 | a<br>2.18 | a<br>1.72 | 0.0147 | *** |
| Astringency | b<br>0.92 | a<br>1.55 | a<br>1.71 | 0.0762 | ** |
| Acidity | b<br>1.08 | a<br>1.56 | a<br>1.61 | 0.0508 | ** |
| Off-Note (Metallic/Licorice) | b<br>0.51 | a<br>1.11 | a<br>1.34 | 0.0028 | *** |
| Sweet Aftertaste | c<br>1.08 | b<br>1.75 | a<br>2.25 | 0.0029 | *** |
| Bitter Aftertaste | b<br>0.37 | a<br>0.62 | a<br>0.82 | 0.0464 | *** |
| Overall Liking | a<br>6.34 | b<br>4.6 | b<br>4.65 | 0.0091 | *** |

*= 80% confidence interval,
**= 90% Confidence interval,
***= 95% Confidence interval In this test, the steviol glycoside composition and the Reb D/Reb M blend were parity in sweetness. The 70/30 blend also had significantly higher sweet aftertaste compared to the steviol glycoside composition.

Figure 2A:
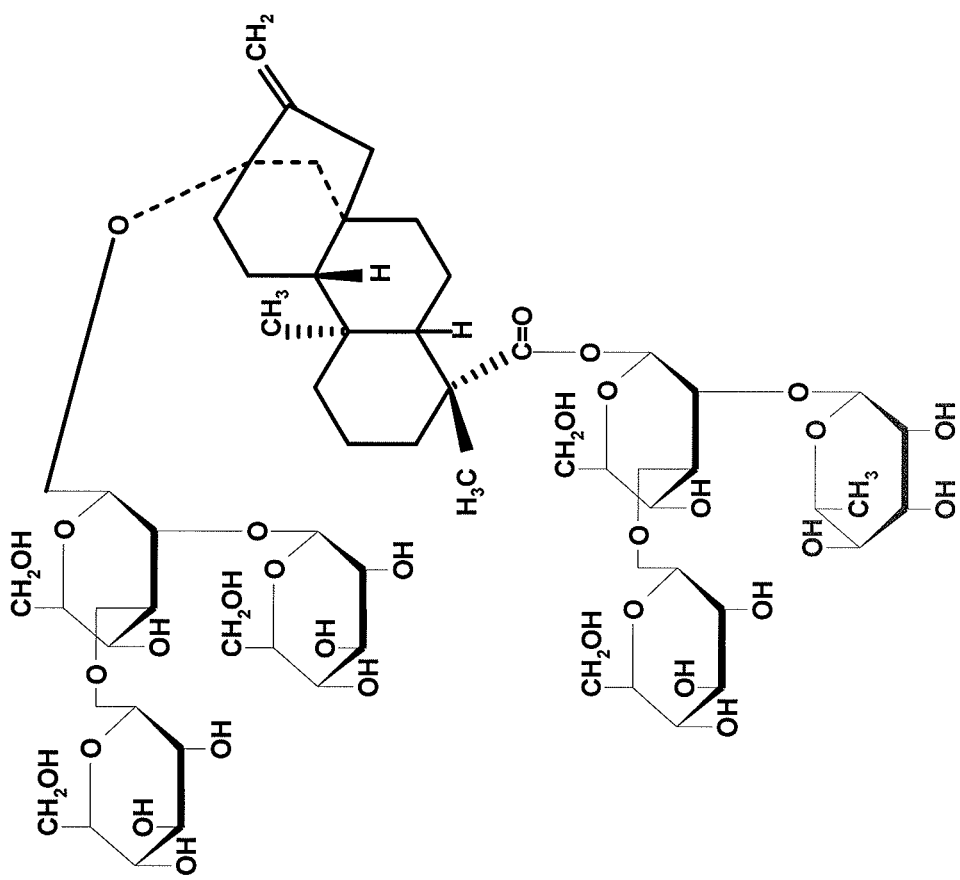
FIG. 2a shows the structure of Rebaudioside N.
Figure 2B:
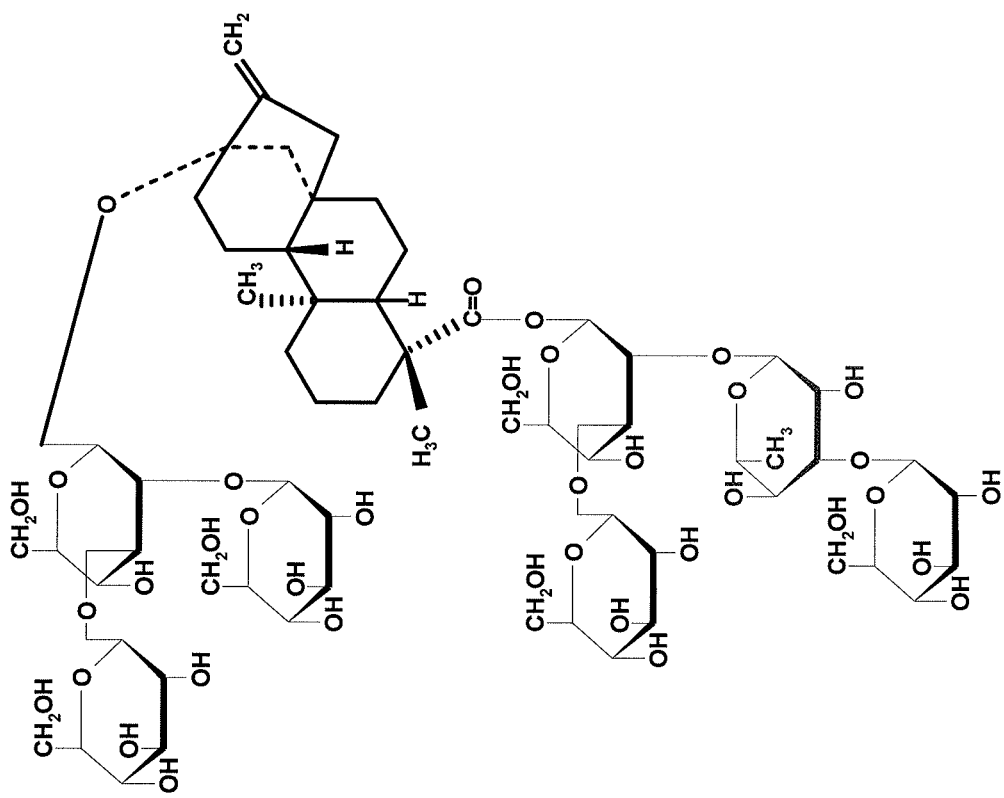
FIG. 2b shows the structure of Rebaudioside O.

While not intending to be bound by theory, it is believed that Rebaudioside N and Rebaudioside O, while present in minor amounts in the steviol glycoside composition, have a favorable impact on the flavor and sweetness profile of the steviol glycoside composition, particularly at the 5 Brix target level. The structures of Rebaudioside N and Rebaudioside O are shown in FIGS. 2a and 2b. However, certain advantages were observed even at the 10 Brix target, making these minor steviol glycosides relevant in the improvement of sweetness profiles.

Example 3: Fructosylated Steviol Glycosides

Figure 3A:
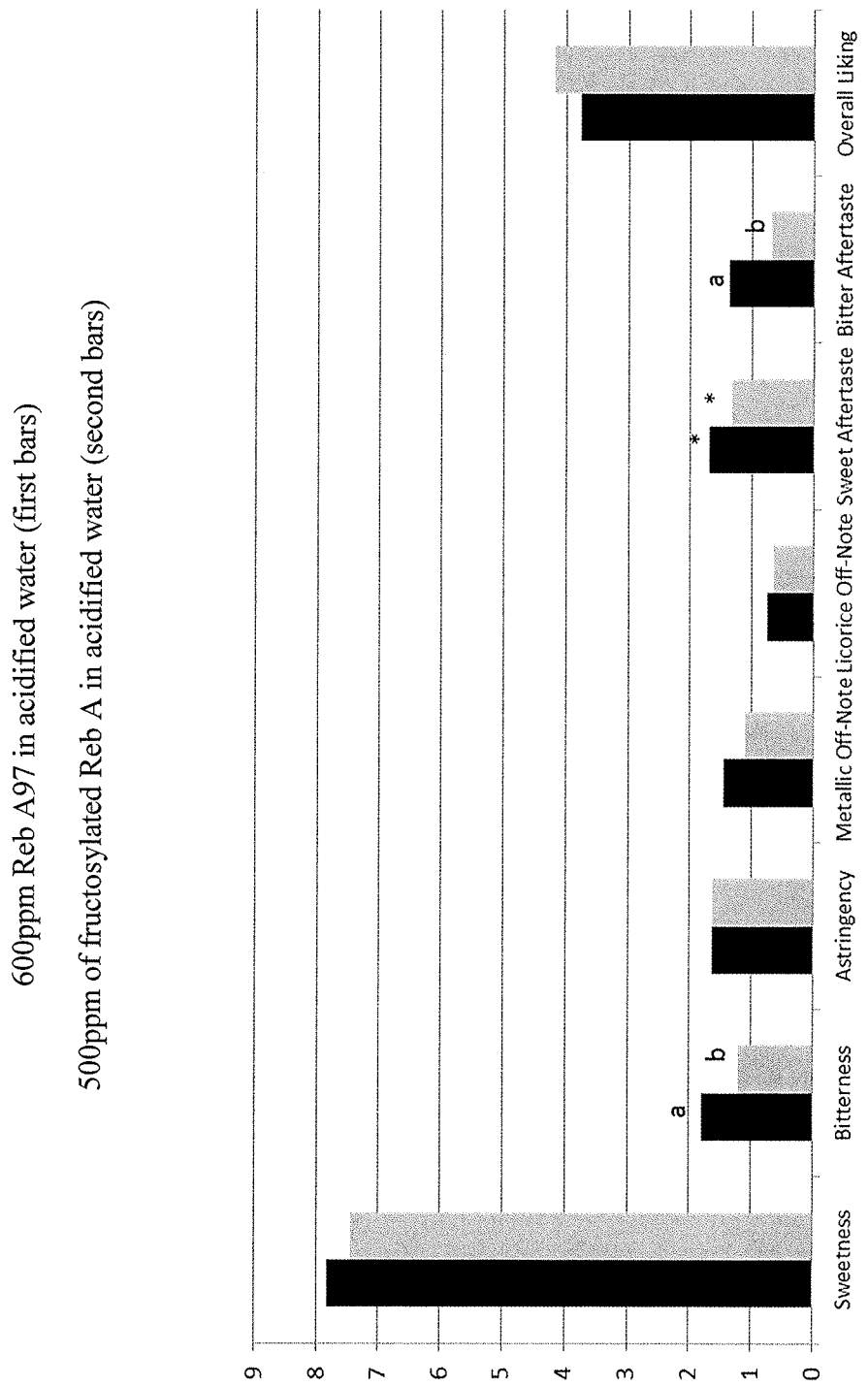
FIG. 3a is a bar graph showing the results of a taste panel. The first bars represent the results from tasting a highly purified (at least 97% pure) Rebaudioside A composition in acidified water. The second bars represent the results from tasting a fructosylated Rebaudioside A composition in acidified water.
Figure 3B:
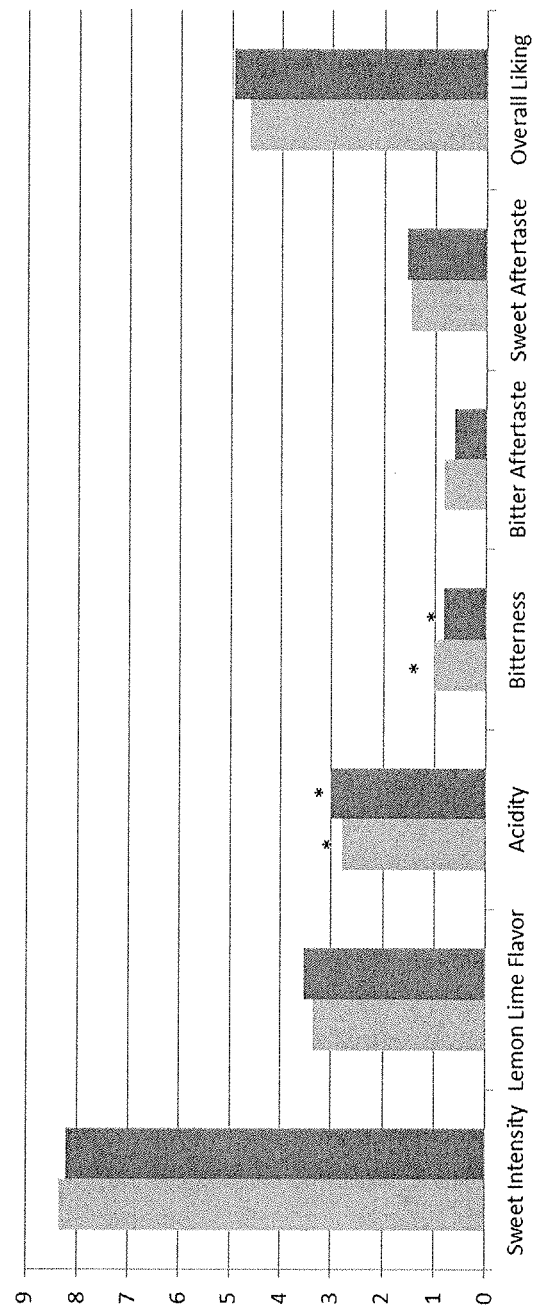
FIG. 3b is a bar graph showing the results of a taste panel. The first bars represent the results from tasting a diet lemon-lime carbonated soft drink including a highly purified Reb M/Reb D blend, wherein the blend includes 50% Reb M and 50% Reb D by weight. The second bars represent the results from tasting a diet lemon-lime carbonated soft drink including a fructosylated Rebaudioside A composition.

It was discovered that adding one or more fructose molecules to rebaudioside A provides flavor and sweetness profile advantages. It is believed that fructosylation of rebaudioside A or other steviol glycosides, including minor steviol glycosides, can provide characteristics that are similar to or even better than highly purified steviol glycosides. Rebaudioside A was subjected to a glycosylation process to add fructose to the G1 and G2 positions, and compared to a highly purified rebaudioside A composition in acidified water, and a highly purified Reb M/Reb D blend in a diet lemon-lime carbonated soft drink. The results from a trained test panel are shown in FIGS. 3a and 3b.

Example 4: Glycosylated Minor Steviol Glycosides

It was discovered that in addition to their favorable impact on the flavor and sweetness profiles of steviol glycoside compositions, the impact of minor glycosides can be improved when they are glycosylated. Glycosylated steviol glycosides (GSG) have one or more glycoside moieties attached to the steviol glycoside backbone, and have been found to have a favorable impact on attributes such as bitterness, sweetness aftertaste, etc. on steviol glycoside compositions. Glycosylated minor steviol glycosides can improve the flavor and sweetness profiles of steviol glycoside compositions to be similar to or even surpass the flavor and sweetness profiles of highly purified steviol glycosides, thereby providing an efficient and effective alternative to highly purified steviol glycosides.

The glycoside moiety can be any monosaccharide, disaccharide, or oligosaccharide, such as glucose, fructose, rhamnose, xylose, and the like. The glycoside moiety can be a single molecule, or can be a chain of molecules, for example, 2, 3 or 4 glucose units attached to the steviol glycoside. The glycosylation process typically results in the glycoside moiety attaching to the C-13 or C-19 position on the steviol glycoside.

In one embodiment, a rebaudioside A and minor steviol glycoside composition was glycosylated. The minor steviol glycoside content included glycosylated rebaudioside Q at about 19% by weight, and glycosylated rebaudioside R at about 18% by weight.

Figure 4A:
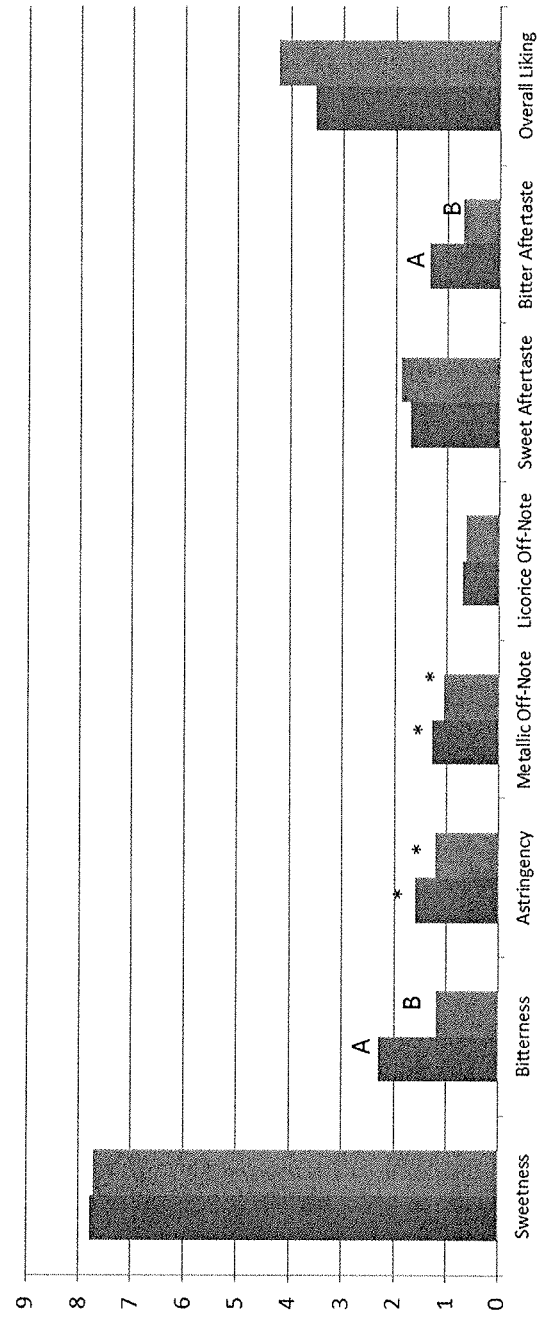
FIG. 4a is a bar graph showing the results of a taste panel. The first bars represent the results from tasting a highly purified (at least 97% pure) Rebaudioside A composition in acidified water. The second bars represent the results from tasting a glycosylated minor steviol glycoside composition in acidified water, wherein the glycosylated minor steviol glycoside composition contains 19% glycosylated Reb Q by weight and 18% glycosylated Reb R by weight.
Figure 4B:
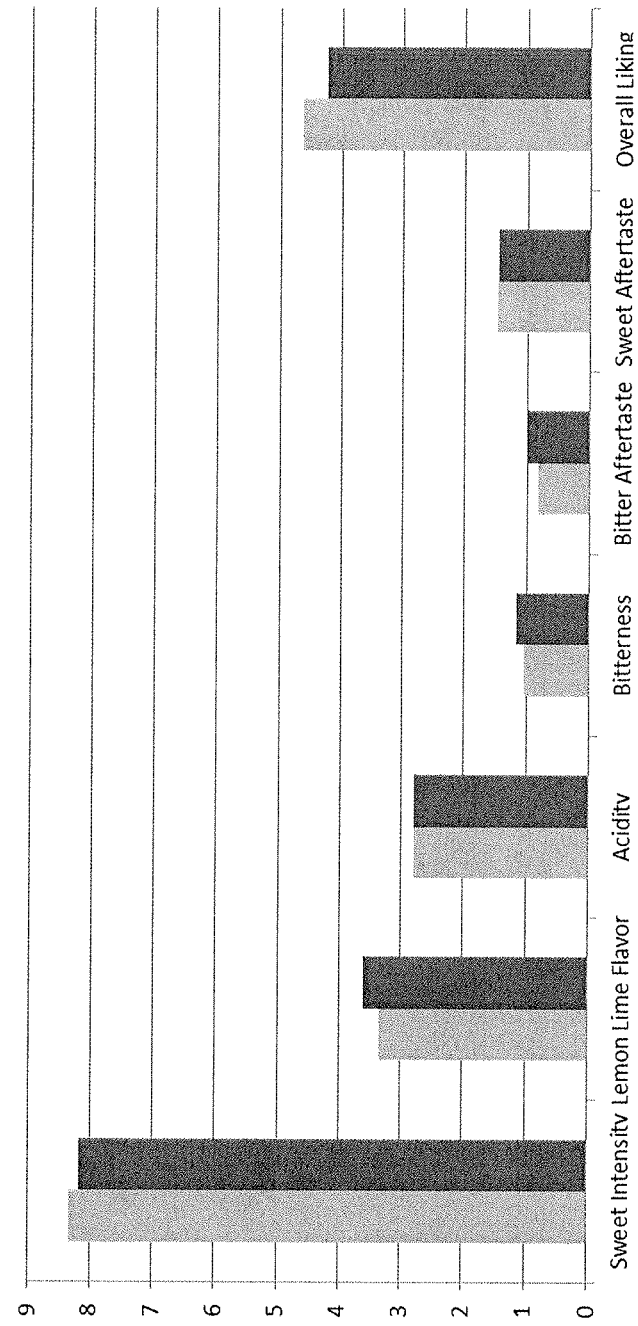
FIG. 4b is a bar graph showing the results of a taste panel. The first bars represent the results from tasting a diet lemon-lime carbonated soft drink including a highly purified Reb M/Reb D blend, wherein the blend includes 50% Reb M and 50% Reb D by weight. The second bars represent the results from tasting a diet lemon-lime carbonated soft drink including a glycosylated minor steviol glycoside composition in acidified water, wherein the glycosylated minor steviol glycoside composition contains 19% glycosylated Reb Q by weight and 18% glycosylated Reb R by weight.

Acidified water and diet lemon-lime carbonated soft drink samples containing various amounts of glycosylated minor steviol glycoside composition were tested by a trained panel, and the results are shown in FIGS. 4a and 4b. As can be seen, the glycosylated minor steviol glycoside-containing composition performed nearly the same as, and in some cases better than, highly purified steviol glycoside compositions (Reb A and Reb M/Reb D) across a number of sweetness and flavor attributes.

It is to be understood that the foregoing descriptions and specific embodiments shown herein are merely illustrative of the best mode of the invention and the principles thereof, and that modifications and additions may be easily made by those skilled in the art without departing for the spirit and scope of the invention, which is therefore understood to be limited only by the scope of the appended claims.

The invention claimed is:

1. A steviol glycoside sweetener composition comprising a 70:30 blend of rebaudioside D and rebaudioside M, wherein the blend is present in the sweetener composition in an amount greater than 80% by weight of the composition, and wherein the steviol glycoside sweetener composition further comprises minor steviol glycosides Rebaudioside N and Rebaudioside O, each of the minor glycosides being present in the steviol glycoside sweetener composition in an amount ranging from 1% to 5% by weight of the composition.

2. The steviol glycoside composition of claim 1, wherein at least one minor steviol glycoside is glycosylated.

3. The composition of claim 1, wherein the minor steviol glycosides provide astringency, acidity, off-note, bitter aftertaste, and sweet aftertaste taste attributes that are more similar to a sugar solution than the blend without said minor steviol glycosides.

4. The composition of claim 1, wherein the blend with the minor glycosides provides a sweetness profile more similar to a 5 Brix solution than the blend without the minor glycosides.

5. The composition of claim 1, wherein the blend with the minor glycosides has a lower astringency, lower acidity, lower off-notes, lower sweet aftertaste, and lower bitterness, than the blend without the minor glycosides, relative to a 10 Brix solution.

6. The composition of claim 1, wherein each of the minor glycosides is present in the steviol glycoside sweetener composition in an amount ranging from 1% to 3% by weight of the composition.

* * * * *